United States Patent [19]

Nanny et al.

[11] 4,438,754
[45] Mar. 27, 1984

[54] METHOD FOR SENSING AND REMOTELY CONTROLLING A TOOL TO WORKPIECE SPATIAL RELATIONSHIP

[75] Inventors: Walter C. Nanny; Thomas L. Stewart; Dean P. Hemphill, all of Houston, Tex.

[73] Assignee: Shell Oil Company, Houston, Tex.

[21] Appl. No.: 301,259

[22] Filed: Sep. 11, 1981

Related U.S. Application Data

[63] Continuation of Ser. No. 66,366, Aug. 14, 1979, abandoned, which is a continuation of Ser. No. 850,311, Nov. 10, 1977, abandoned.

[51] Int. Cl.³ .................... G01B 7/14; G01N 27/72; G01R 33/12
[52] U.S. Cl. ..................... 125/14; 324/207; 324/226; 324/243; 51/165.92; 83/368; 83/924
[58] Field of Search ........ 324/207, 200, 228, 229–231, 324/243, 226; 83/63, 368, 924; 125/14; 51/165.92

[56] References Cited

U.S. PATENT DOCUMENTS

| 3,340,467 | 9/1967 | Inwhanha | 324/228 |
| 3,907,136 | 9/1975 | Christides et al. | 324/67 |
| 3,930,324 | 1/1976 | Wightman et al. | 324/243 |

FOREIGN PATENT DOCUMENTS

| 2265046 | 2/1976 | Fed. Rep. of Germany | 324/208 |
| 53399 | 1/1967 | German Democratic Rep. | 324/230 |

Primary Examiner—Gerard R. Strecker
Assistant Examiner—Walter E. Snow

[57] ABSTRACT

An electromagnetic system is provided for accurately sensing and remotely controlling a tool-to-workpiece spatial relationship. A typical application of the system may include a saw being sensor controlled through the process of removing a reinforced concrete covering from and about an underwater pipe or other metallic object that must be protected.

3 Claims, 5 Drawing Figures

METHOD FOR SENSING AND REMOTELY CONTROLLING A TOOL TO WORKPIECE SPATIAL RELATIONSHIP

This is a continuation of application Ser. No. 066,366, filed Aug. 14, 1979 now abandoned which is a continuation of 850,311 filed Nov. 10, 1977 now abandoned.

BACKGROUND OF THE INVENTION

The removal of reinforced concrete and/or various other corrosion-protective coatings from and about an underwater structure, such as a pipeline, is particularly difficult and labor intensive. There have been numerous experiences of structural damage during the process of removing such coatings, particularly by divers in the preparation of underwater structural connections. A gouged, scored, or partially cut structure serves as a stress concentration point which potentially could lead to a structural weakening or failure.

In the case of deepwater pipelines, it is essential that some type of remote inspection system be employed to remove coatings and effect repairs to the pipe inasmuch as such working depths may be below ordinary diver inspection capabilities. The use of a saw for removing concrete coatings requires that the thickness of the concrete be determined prior to inserting the concrete cutting device and, when initiated, continuously monitored throughout the cutting process in order to avoid damage to the pipeline. It is known in the art that a magnetometer device may be employed to detect reinforcing bars in concrete and to determine the approximate thickness of the concrete cover over the bars within accuracy limitations (James Electronics, Inc., "Application and Operating Manual" for Model C-4952 "R" Meter). However, the situation becomes more complicated in the case of pipelines or other metallic structural shapes that must be protected from damage and which may be covered with concrete containing embedded mesh or wire reinforcements. The magnetometer device of the prior art is not capable of "seeing through or ignoring" embedded magnetic materials or the removal mechanism in order to "see or detect" the primary structure itself—in this case, the pipe.

Accordingly, the present invention, in answer to this need in the art, provides an integrating electromagnetic sensor device and method for use thereof, capable of detecting the thickness of a pipe covering membrane about a pipe—the covering membrane, potentially, also containing magnetic aggregates in addition to embedded magnetic reinforcements.

SUMMARY OF THE INVENTION

The present invention provides a method and apparatus for sensing distance between a given point and a primary magnetic material and comprises the disposing of two magnetic field-generating probes on opposite sides of said given point, each probe having a north and south pole face, generating a magnetic field extending between the north pole of each probe and the south pole of the other probe, sensing the disturbing effect of said magnetic material in said field, and corrolating the distance from said given point with the extent of said disturbing effect.

In a preferred embodiment, the magnetic material comprises two parts, one substantially larger than the other, with the smaller part (the concrete reinforcement member and/or magnetic aggregate) being between the larger part (in this example—the pipe) and said given point (the cutting surface), whereby the disturbing effect of the larger part is massive while the disturbing effect of the smaller part is minimal, thereby facilitating the determination of the distance between said given point and said larger part of the magnetic material. The resultant distance measurement signals may include direct reading displays in digital or analog form appropriate to the local or remote environment.

In a more-preferred embodiment of the invention, the given point is within the plane of, or in proximate relationship with, the edge of a cutting device which is disposed outside an underwater pipe that is encapsulated by a concrete coating system that may also include embedded steel reinforcement bars or wire mesh.

DESCRIPTION OF PREFERRED EMBODIMENTS

The present invention relates, in particular, to a device for accurately determining the outside diameter of a pipe encased by reinforced concrete and/or various corrosion-protective coating systems. The device includes an electromagnetic sensor which incorporates a cutting tool and has circuitry such that increasingly accurate dimensional data is provided as the tool approaches a pipe wall. Since magnetic materials, such as iron ore, steel reinforcement bars, and/or galvanized wire mesh are commonly used for weighting and otherwise protecting metallic submarine structures, it is necessary to provide a sensor system with the capability of "seeing through or ignoring" these materials and "seeing" the primary structure itself. The electromagnetic sensor of the present invention with tool-tip recognizing capabilities is simple, light-weight, small-sized, safe, remotely controllable, and long-lifed. It is ideal for use as part of a submersible pipeline repair system tool package.

The basic theory of the present invention is that by placing a magnetic sensor on both sides of a saw blade or other tool, the signals obtained from rebars or other interfering magnetic materials are cancelled as the dual sensors preferentially detect the steel pipe because of the massive flux response compared to that from a latticed network of wire meshes or rebars in a superposed concrete matrix.

In actual practice, the electromagnetic sensor system accurately registers the spatial relationship between a saw blade or other tool and a steel pipe or other workpiece. The effect of the intervening magnetic materials of minor size such as rebars embedded in a concrete matrix or other coating is negligible. The signal is rectified to provide a linear response and is ideal for use in a servo system for remote controlling of the cutting operation or other function. Other important applications of the device include sensing the location of a pipeline relative to a pipe preparation module so as to guide its soft landing upon the pipeline; measuring the roundness and straightness of a pipe regardless of its encapsulating medium; and utilizing the system in advance of a sheath-removal process to indicate location of a pipeline in a submersible pipeline repair system, thereby minimizing on-bottom time. For such applications, longer-distance sensing probes are fixed symmetrically and on each end about a repair module straddling the pipe which are operatively adapted to locate the pipe and determine its three-dimensional attitude relative to the module.

Figure 1:
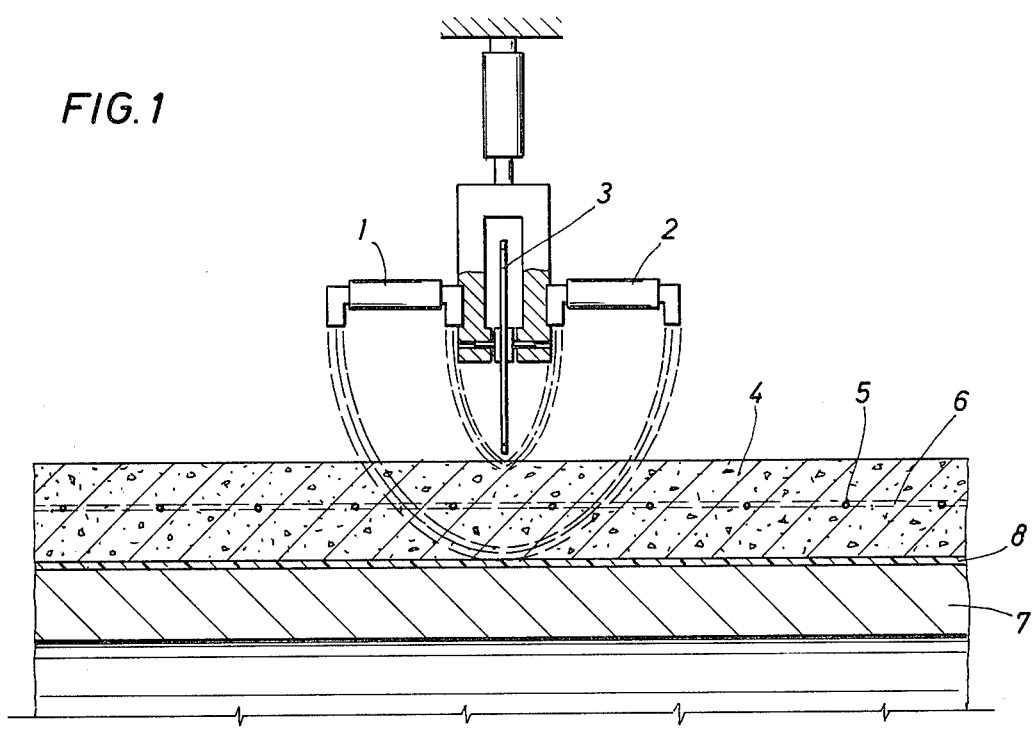
FIG. 1 discloses probes mounted on both sides of a saw blade which is located in the proximity of a concrete-covered steel pipe for a transverse cutting sequence. (A 90° blade rotation would provide the longitudinal cut orientation.)

FIG. 1 discloses the electromagnetic senor system of the present invention in combination with a saw in a precut mode. Magnetic fields extend from opposite poles of probes 1 and 2 of the electromagnetic device which are situated on opposite sides of sawblade 3 near the surface of a concrete sheath 4 containing rebars 5 and/or wire mesh 6. The concrete sheath encloses a steel pipe or plate 7 which may have a protective anti-corrosion coating 8. The intensity of the magnetic field is inversely and exponentially proportional to the distance from the pole faces. Hence, the disturbing effect of magnetic material in the field is also similarly related to the distance from the pole faces. It is relatively difficult for a magnetic field to permeate free space; but it is relatively easy for a magnetic field to permeate magnetic material. When the magnetic material is placed in the field of the probes, all the lines of magnetic force that encounter a more permeable path from one pole face to the other by going through the rebar or pipe rather than by going through nonmagnetic space will do so. This distorts the shape of the magnetic field. In effect, it substantially reduces the intensity of the field in directions away from the pipe.

By placing a sensor on each side of the saw blade or other tool, a "balanced" flux circuit is formed around the magnetically insulated saw blade. In a preferred embodiment, the flux field of appropriately designed probes extends below the saw blade with sufficient intensity to develop a signal with adequate strength to monitor the magnetic workpiece such as a steel plate or pipe when the blade tip is about 12 inches offset in the bench model embodiment described hereinafter. As the blade approaches the steel plate or pipe, the intensity of the signal increases at an exponential rate. Also, as the saw blade and sensors, which are fixed in relationship to each other, approach the steel plate, the magnitude of the signal is at its greatest level. This inherently provides the greatest resolution, i.e. the most accurate spatial relationship, which is desirable since the blade is near the steel surface which is to be protected. Since two sensors are used in the described balanced configuration, a high flux density is present around the saw. The primary flux field always recognizes the larger magnetic workpiece and ignores minor intervening magnetic materials; i.e. because the steel plate or pipe is massive as compared to latticed rebars or reinforcing wire mesh, the effect of the rebars or mesh is minimized.

Examples

A prototype electromagnetic device was constructed for laboratory evaluation. The prototype assembly consisted of a power supply, an electronic package, a meter calibrated to register the distance between a saw blade and a steel plate, steel plates intended to simulate steel pipe, and an 18-inch saw blade mounted in a nonmagnetic framework to simulate cutting conditions. The electronics consisted of two sensors which were connected in an electrical bridge circuit with a differential amplifier and precision rectifier.

The sensors were constructed from steel laminations that were 0.014 inch in thickness. It was determined that the sensors be at least 12 inches in length in order to provide a minimum 12 inch sensing depth. The sensors were placed with the long dimension parallel to the plate and at 45° to the plane of the saw blade. This was the most suitable position because of the spatial limitations that must be accommodated within an undersea pipe preparation module, and it appeared more appropriate to the circular pipe configuration. However, tests were also made with the sensors at 90° relative to the saw blade.

Two basic tests were performed in an atmospheric environment in order to examine the dual sensor concept, measure signal magnitudes, and the shielding effect of intermediately positioned re-bars or wire mesh. Test series No. 1 was a laboratory test using two pieces of 12 inch-by-12 inch-by-¾ inch thick steel plate to simulate a steel pipe.

Test series No. 2 was made on 36 inch OD, 0.625 inch thick, steel pipe.

Test Series No. 1

Test A

A test was made to determine if a readout dial could be calibrated to accurately measure the distance between the saw blade and the steel plates. Two plates were used due to convenience and availability. The test consisted of changing the distance between the saw blade and the steel plate and recording readings of magnetic intensity on the dial. The data was then plotted and additional identical tests were conducted to determine if the signal generated was repeatable.

Figure 2:
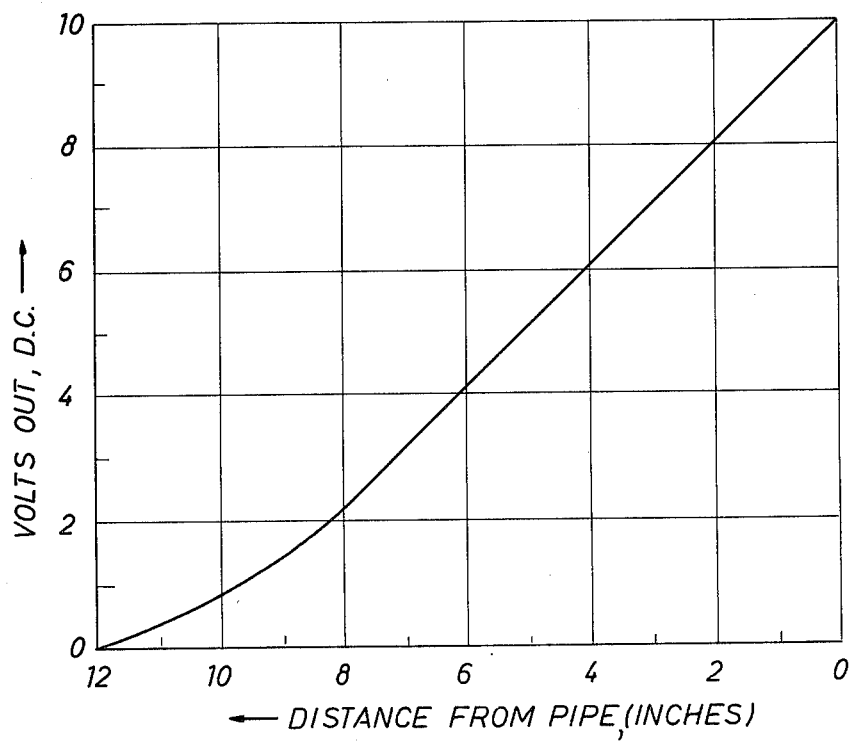
FIG. 2 is a pipe sensor response curve of test results of a prototype bench model assembly designed for a nominal 7-inch thick concrete covering of the pipe.

FIG. 2 is a graph showing the test results. The data verified that the prototype electromagnetic sensor will register the spatial relationship between the saw blade and the steel pipe as a linear function. The test further verified that the system has repeatability.

The tests were made with the sensors at 45° and at 90°, relative to the saw blade. The tests indicated that the sensors performed adequately at the 45° position. The blade could be sensed within ¼ inch of the steel plates. Since having the sensors at 45° is desirable for application in an undersea pipe preparation module due to space limitations and the pipe configuration, no further tests were made with the sensors at 90°.

Test B

The purpose of this test was to determine if the galvanized wire mesh, commonly used to reinforce concrete coating, had any adverse effect on the magnetometer. The wire mesh used was 17 gauge (AWG) with 1½ inch openings.

The test was conducted by passing the wire mesh under the saw blade and between the saw blade and the steel plate. Various combinations of spacing between the saw blade, wire mesh and steel plates were evaluated.

The test indicated that the wire mesh was virtually undetectable by the sensor readings. Because of the very negligible effect of wire mesh interpositioning, no data was recorded.

Test C

The purpose of this test was to determine whether the presence of rebars had any adverse effect on the electromagnetic sensor system. The rebars used for the test were 1½ inch diameter.

Figure 3:
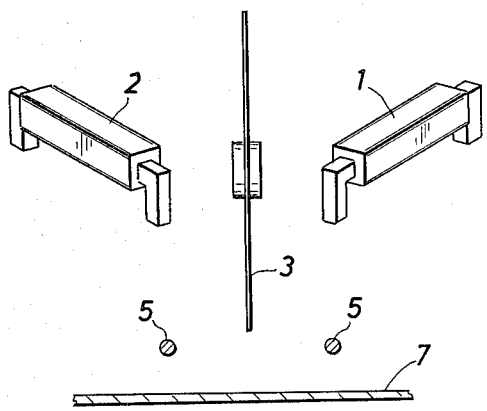
FIG. 3 shows steel reinforcement bars (rebars) which are symmetrically spaced relative to the saw blade.
Figure 4:
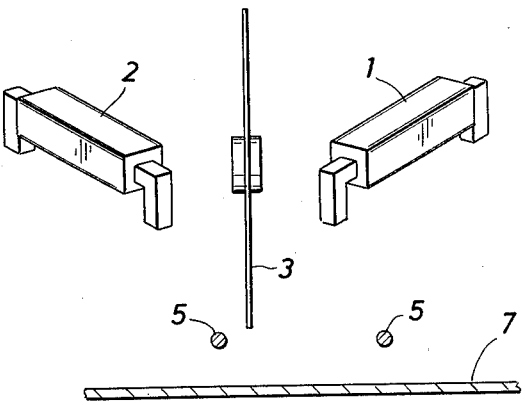
FIG. 4 is as FIG. 3 except the rebars are assymetrically spaced.

Two basic series of tests were made: the rebars being symetrical about the saw blade and the rebars being asymetrical to the saw blade and sensors, as shown in FIGS. 3 and 4.

The test arrangement wherein the rebars were placed symetrically with the saw blade indicated that under these conditions, the rebars had no adverse effect on the signal. This test verified the balancing effect of the two sensors and thus cancelled the effect of the rebars on the sensors.

Figure 5:
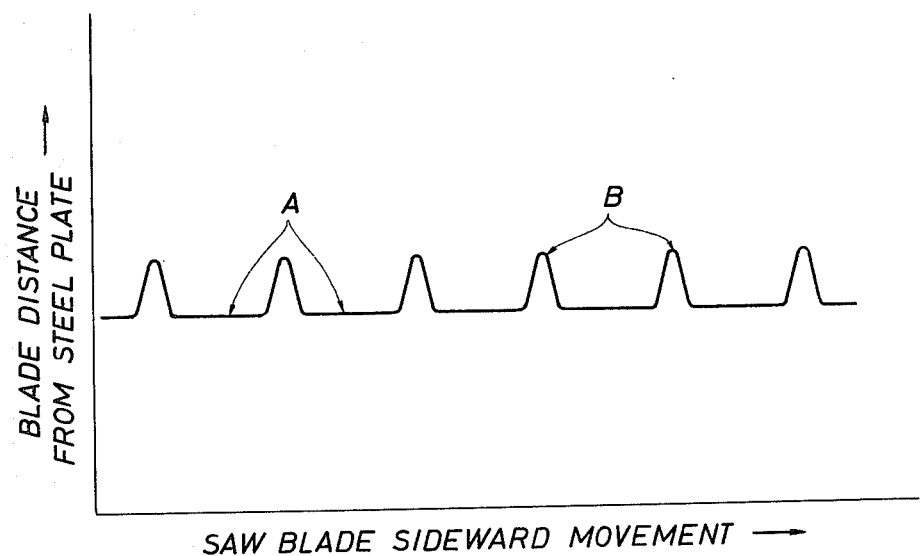
FIG. 5 typifies a strip chart type recording of a precut survey signal response as the sensor-equipped tool is displaced across the offset plate.

However, when the rebars were shifted so they were no longer symetrically placed with respect to the saw blade, as in FIG. 4, the difference was detectable. This would indicate that a precut survey is advisable wherein the saw assembly would be moved along the pipe centerline to verify the depth of the encased pipe. A strip chart record of such a preinspection procedure would generate a straight line with a series of anomolies denoting reinforcements. FIG. 5 would typify a strip record of a precut survey. "B" are points at which the rebars are assymmetrical with the saw blade sensors; "A" are points at which the rebars are symmetrical with the saw blade sensors.

Test Series No. 2

The purpose of Test Series No. 2 was to determine how the prototype electromagnetic sensor system would function if it were tested with an actual section of pipe. As discussed earlier, the basic theory of the balanced-sensor electromagnetic device of the present invention is that the effect of the rebars is negligible when the rebars are near a pipe because the steel pipe is massive relative to the rebars. As noted in Test C of Series No. 1, the presence of symmetrically-spaced rebars was not detectable; the assymmetrically-spaced rebars were detectable but would not disorient the system control by employment of the presurvey technique described in Test C of Series 1.

The following conditions were examined: rebars placed symmetrical and parallel to the saw blade at various distances from the saw blade; rebars placed assymmetrical and parallel to the saw blade at various distances from the saw blade, and at various heights from the pipe; rebars placed symmetrical and perpendicular to the saw blade, the offset distance from the saw blade varying from 6 inches to actually touching the saw blade with the rebars being placed at various distances from the surface of the pipe; the preceding conditions repeated with the rebars being assymmetrical with the saw blade.

The tests confirmed the basic theory that galvanized wire mesh and/or ½-inch diameter rebars commonly employed in pipe weight jacket systems would not affect the saw blade and pipe distance readings subject to employment of the presurvey technique discussed in Test C of Series 1.

What is claimed is:

1. A method for cutting and removing concrete containing embedded reinforcement from about a pipe, said cutting being effected with a saw blade without cutting the pipe, comprising:

disposing two magnetic field generating probes on opposite sides of the saw blade, each probe having a north and south pole face and the saw blade being magnetically insulated;

generating a magnetic field extending between the north pole of each probe and the south pole of the other probe;

sensing the massive disturbing effect of the pipe and the minimal disturbing effect of the reinforcement;

distinguishing between the massive disturbing effect and the minimal disturbing effect to determine the distance between the saw blade and the pipe; and cutting and removing the concrete containing embedded reinforcement without cutting the pipe by maintaining not less than the determined distance between the pipe and the saw blade.

2. The method of claim 1 wherein the probes and saw are moved along the surface of the concrete-covered pipe, and irregular disturbing effects of the magnetic field are sensed and correlated to verify the roundness and/or straightness of the pipe within the concrete cover and/or the structural integrity of the pipe.

3. The method of claim 2 wherein the probes and saw are remotely operated and are used to determine the relative spatial relationship of the concrete-covered pipe to the probes and saw.

* * * * *